Patented Nov. 23, 1926.

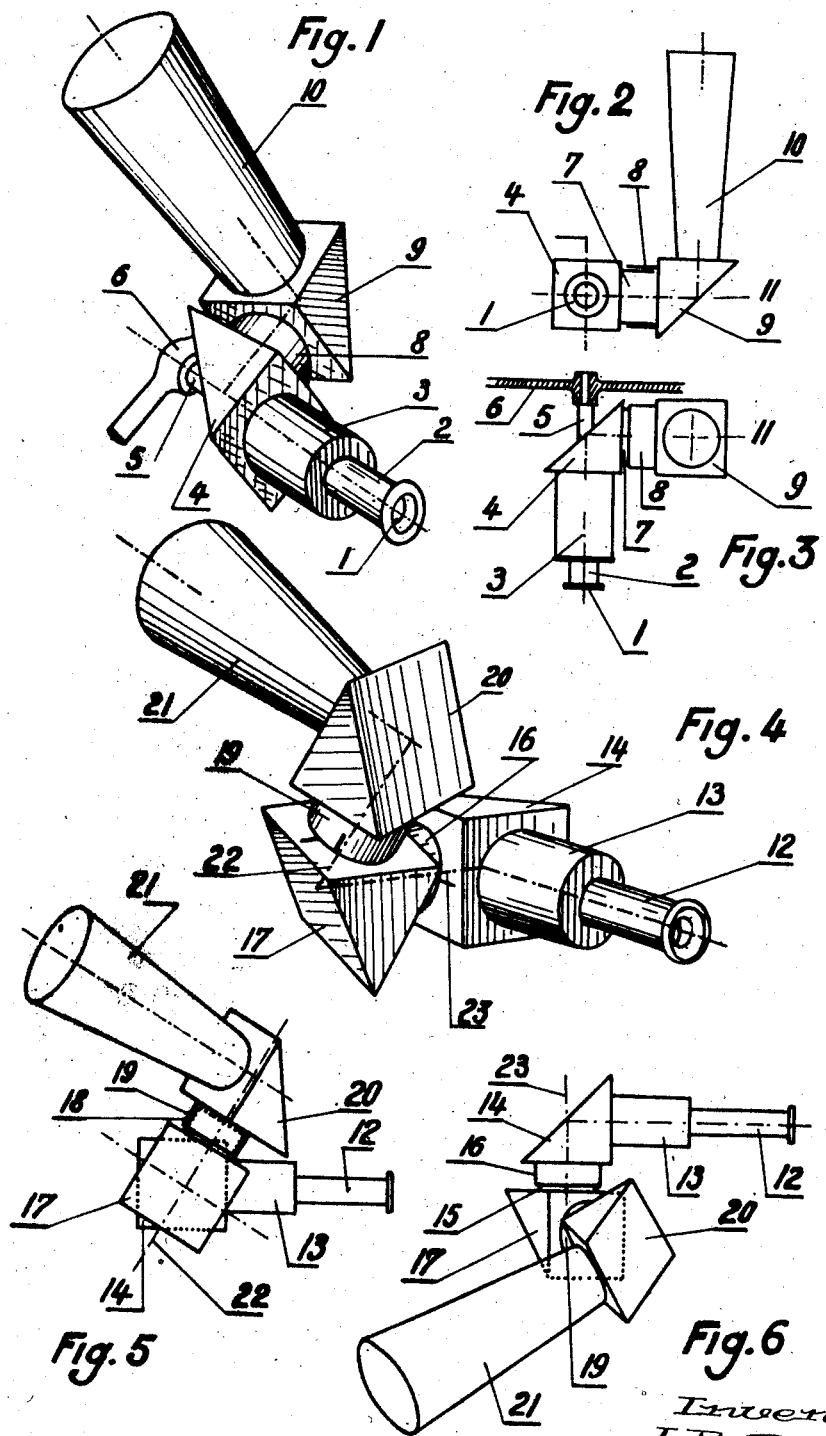
Nov. 23, 1926.    1,607,688
J. B. PERRIN ET AL
TELESCOPE OF THE RIGHT-ANGLED TYPE WITH FIXED EYEPIECE AND MOVABLE OBJECTIVE, CHIEFLY APPLICABLE TO THE OBSERVATION OF AERIAL OBJECTS
Filed Feb. 1, 1924

1,607,688

UNITED STATES PATENT OFFICE.

JEAN BAPTISTE PERRIN AND ANDRÉ JULES MARCELIN, OF PARIS, FRANCE.

TELESCOPE OF THE RIGHT-ANGLED TYPE WITH FIXED EYEPIECE AND MOVABLE OBJECTIVE, CHIEFLY APPLICABLE TO THE OBSERVATION OF AERIAL OBJECTS.

Application filed February 1, 1924, Serial No. 690,038, and in France February 12, 1923.

Our invention relates to a telescope by which an observer while remaining in the fixed position is enabled to cover the various points of three-dimensional space, and in the case of moving objects to follow the same in all their displacements.

For this purpose, our said telescope comprises a fixed eye-piece, whilst the objective is movable in all directions by the rotation of the instrument upon two suitable axes; the telescope is of a right-angled type, and the rays are led from the movable objective to the fixed eye-piece by a set of suitably disposed prisms or mirrors.

In the appended drawings, Figs. 1 to 3 show by way of example two constructional forms of a telescope in accordance with the invention.

Fig. 1 is a perspective view of a constructional form of the apparatus,

Fig. 2 is a rear elevational view, and Fig. 3 a plan view.

Fig. 4 is a perspective view of another constructional form of the apparatus.

Fig. 5 is an elevational view and Fig. 6 a plan view.

Figs. 5 and 6 show the position of the various parts of the telescope for an azimuth of 30 degrees and elevation 30 degrees.

In the constructional form shown in Figs. 1 to 3, the eye-piece 1 is disposed at the end of a horizontal tube 2 coaxial with a larger tube 3 having at the end a total reflection prism 4. This arrangement is movable on the centre line of a horizontal shaft 5 coinciding with the common axis of the tubes 2 and 3, said shaft rotating in a bearing 6 secured to the telescope frame. At the centre of the face of the prism which is perpendicular to the face in contact with the tube 3 is disposed a sleeve 7 fitting into a second sleeve 8 mounted upon one of the lateral faces of a total reflection prism 9 whereof the other lateral face carries the objective tube 10 which is suitably expanded so as to augment the field of the apparatus.

The whole device is thus adapted to rotate on the axis 5, and the prism 4 carries with it the second prism 9 and the objective tube 10. On the other hand, the device consisting of the prism 9 and the objective 10 is revoluble on the common axis of the sleeves 7 and 8, perpendicular to the first-mentioned axis.

The observer is stationed before the eye-piece 1, and while remaining in the fixed position he can direct the objective upon the target by turning it on the axes 3 and 11; in this motion, the eye-piece turns solely on its axis, and the conditions are the same as if the eye-piece were stationary. The eye-piece might in fact be made entirely stationary by causing the tube 3 to rotate about the tube 2.

In the device shown in Figs. 4 to 6, the eye-piece 12 is extended by the tube 13 having at the end thereof the total reflection prism 14 by which the rays from the eye-piece are sent in the perpendicular direction. At the centre of the lateral face of the prism which is perpendicular to the face carrying the tube 13 is disposed a sleeve 15 having revoluble thereon a like sleeve 16 mounted upon a second total reflection prism 17, whereby the rays horizontally reflected by the prism 14 are sent in the perpendicular direction.

Upon the lateral face of the prism 17 is mounted the tube 18 revoluble within a sleeve 19 which is mounted upon one of the lateral faces of a third total reflection prism 20 by which the rays reflected by the prism 17 are sent into the suitably expanded objective tube 21. In this manner the objective is revoluble on the axis 22 common to the tubes 18 and 19, and it can thus take azimuth positions; it is also revoluble on the axis 23 common to the tubes 15, 16 and can thereby assume positions of elevation.

Particular forms of the said apparatus may be constructed in the shape of land or marine periscopes, or telemeters.

What we claim is:

In a panoramic telescope adapted for a fixed direction of sight, a shaft secured to the rear end of the eye-piece and extending rearwardly thereof in a direction parallel to the fixed direction of sight and a stationary bearing wherein said shaft is adapted to rotate.

In witness whereof they have hereunto set their hands.

JEAN BAPTISTE PERRIN.
ANDRÉ JULES MARCELIN.